United States Patent Office.

THEODORE WILLIAM HEINEMANN, OF NEW YORK, N. Y.

Letters Patent No. 76,757, dated April 14, 1868.

IMPROVED MODE OF PURIFYING, SEASONING, AND PRESERVING WOOD.

The Schedule referred to in these Letters Patent and making part of the same.

TO ALL WHOM IT MAY CONCERN:

Be it known that I, THEODORE WILLIAM HEINEMANN, of the city, county, and State of New York, have invented a new and improved Mode of Purifying, Seasoning, and Preserving Wood; and that the following is a full and exact description thereof.

All good modes heretofore known may be divided into four classes: First, such as wash out some of the nitrogenous matter contained in wood; second, such as convert it by metallic salts into insoluble compounds; third, such as fill up the pores with bituminous or fatty substances; fourth, such as are combinations of the two last named.

As disadvantages of the modes of the first class may be mentioned, that none of those now in use remove all nitrogenous matter, that they all increase the capacity of the pores for water, and the fermenting substances conveyed by it in proportion to their effectiveness, and thereby contribute to the liability of the wood to decay, attacks of insects, and bursting from frost.

The modes of the second class are very expensive. The metallic salts used are themselves decomposed by combining with the nitrogenous compounds of the wood, and, as a consequence, either acid or base is disengaged to act injuriously upon it. The pores also remain liable to absorb water, and to the dangers mentioned above as depending upon its presence.

The methods of the third class generally penetrate thick or long pieces but imperfectly, and leave them, therefore, subject to dry rot; particularly so because the materials used always contain substances which have a tendency to ferment, only partially counteracted by the presence of a small percentage of carbolic acid in some of them.

The modes of the fourth class, as a matter of course, are doubly expensive, and the wood treated by them remains liable to be injuriously affected by the disengaged base or acid of the metallic compound used.

My invention consists in obviating the defects of all these modes, and combining their merits as follows:

I first boil the wood in a weak solution of carbonate of soda or any other alkali, or muriatic acid, (pure, crude, or waste materials will answer equally well, but of the pure, one part in fifty to two hundred of water is strong enough,) until the liquor ceases to abstract color from the wood, which then is free of nitrogenous matter, and consequently no longer subject to spontaneous decay, and after drying in the usual way, if intended for use where it will not be exposed to the inroads of water, insects, &c., needs no other treatment. But if it be intended for railway-sleepers, or purposes where it may be much exposed, or come in contact with nitrogenous or fermenting substances, I subject it to a second treatment in a close boiler, of suitable size and shape, strong enough to bear a very high pressure, conveniently fitted with an air-tight door, also with horizontal cross-bars, which serve as braces to strengthen the boiler, and at the same time keep the wood from floating, with a safety-valve, discharge-cock, pressure-gauge, and thermometer.

Into this boiler I put the wood, and with it enough rosin, when liquefied, to cover it, and sufficient water to fill, when converted into steam, the whole of the remaining space in the boiler. I then close the door tightly, and heat the boiler gradually until the thermometer shows the contents to be at about 306° Fahrenheit, when the rosin is as liquid and penetrating as boiling water, and the steam, being of a very high pressure, forces the rosin through all the pores of the wood. I keep the same temperature up just long enough to have the wood evenly heated all the way through, the time varying according to the thickness of the pieces treated. After that I lessen the heat gradually, until the thermometer shows the mass inside the boiler to have cooled down to about 200° Fahrenheit, when I suddenly raise the temperature again, and as soon as the rosin has become sufficiently liquid, I open the discharge-cock and allow it to drain off. The wood may then be taken out, and on cooling will be found very compact, hard, elastic, impervious to water, even if left in it for a long time, not subject to shrinking, warping, or the attacks of insects, and indestructible except by fire.

If it be desirable, however, to make the wood effectually resist even the power of the last-mentioned agent of destruction, I substitute soda or potash water-glass instead of the rosin, in the process last described, and after thoroughly impregnating it, dry it and allow it to lie for some time in muriatic acid or some concentrated solution of a metallic salt, which will make an insoluble silicate.

It will be found desirable that the boiler used in this process should be heated by suitable flues, capable of being regulated by dampers.

Any organic resin, asphalte, pitch, or any similar substance may be substituted for rosin, if desirable.

What I claim as my invention, and desire to secure by Letters Patent, is—

1. The method herein described of purifying, seasoning, and preserving wood, by first freeing it from substances liable to spontaneous decay, in the manner described, and afterwards impregnating it with any of the substances herein specified, or their equivalents, by means of high-steam pressure, substantially as described.

2. I also claim the method herein described of impregnating wood with any of the substances specified, or their equivalents, by means of high-steam pressure, when the steam is generated and superheated in the same boiler or retort in which the wood and impregnating-substances are contained, and subjected to steam-pressure, substantially as set forth.

THEO. WM. HEINEMANN.

Witnesses:
  WALLACE HAHN,
  W. M. KING.